United States Patent [19]
Bowers

[11] Patent Number: 5,730,456
[45] Date of Patent: Mar. 24, 1998

[54] METHODS AND APPARATUS FOR LOCKING A TRAILER HIGH TO A RECEIVER

[76] Inventor: John P. Bowers, 581 Palamaro Cir., Nokomis, Fla. 54295

[21] Appl. No.: 634,724

[22] Filed: Apr. 19, 1996

[51] Int. Cl.⁶ .................................. B60D 1/60
[52] U.S. Cl. .................. 280/507; 280/491.5; 280/495
[58] Field of Search ................... 280/491.2, 491.5, 280/495, 507

[56] References Cited

U.S. PATENT DOCUMENTS

| | | | |
|---|---|---|---|
| 3,514,980 | 6/1970 | Doyle | 280/507 |
| 3,782,761 | 1/1974 | Cardin, Sr. | 280/501 |
| 5,000,067 | 3/1991 | Kolbusz et al. | 280/507 X |
| 5,242,186 | 9/1993 | Pettersson | 280/491.5 X |

FOREIGN PATENT DOCUMENTS 863001  1/1953  Germany ................... 280/491.5

*Primary Examiner*—Christopher P. Ellis
*Attorney, Agent, or Firm*—Burns, Doane, Swecker & Mathis, L.L.P.

[57] ABSTRACT

A trailer hitch includes a hollow tube insertable into a hollow receiver of a towing vehicle. Mounted inside of the tube are a pair of locking bolts and a key actuated locking cylinder. The locking bolts are spring biased outwardly through aligned holes in the tube and receiver for locking the trailer hitch to the receiver. The locking bolts are restrained against movement to an unlocking state by an arm which is connected to the key-actuated tumbler cylinder disposed within the tube. A key can be inserted into the tumbler cylinder and rotated to move the arm to an unlocking state, permitting the locking bolts to be pushed manually inwardly to an unlocking state.

9 Claims, 3 Drawing Sheets

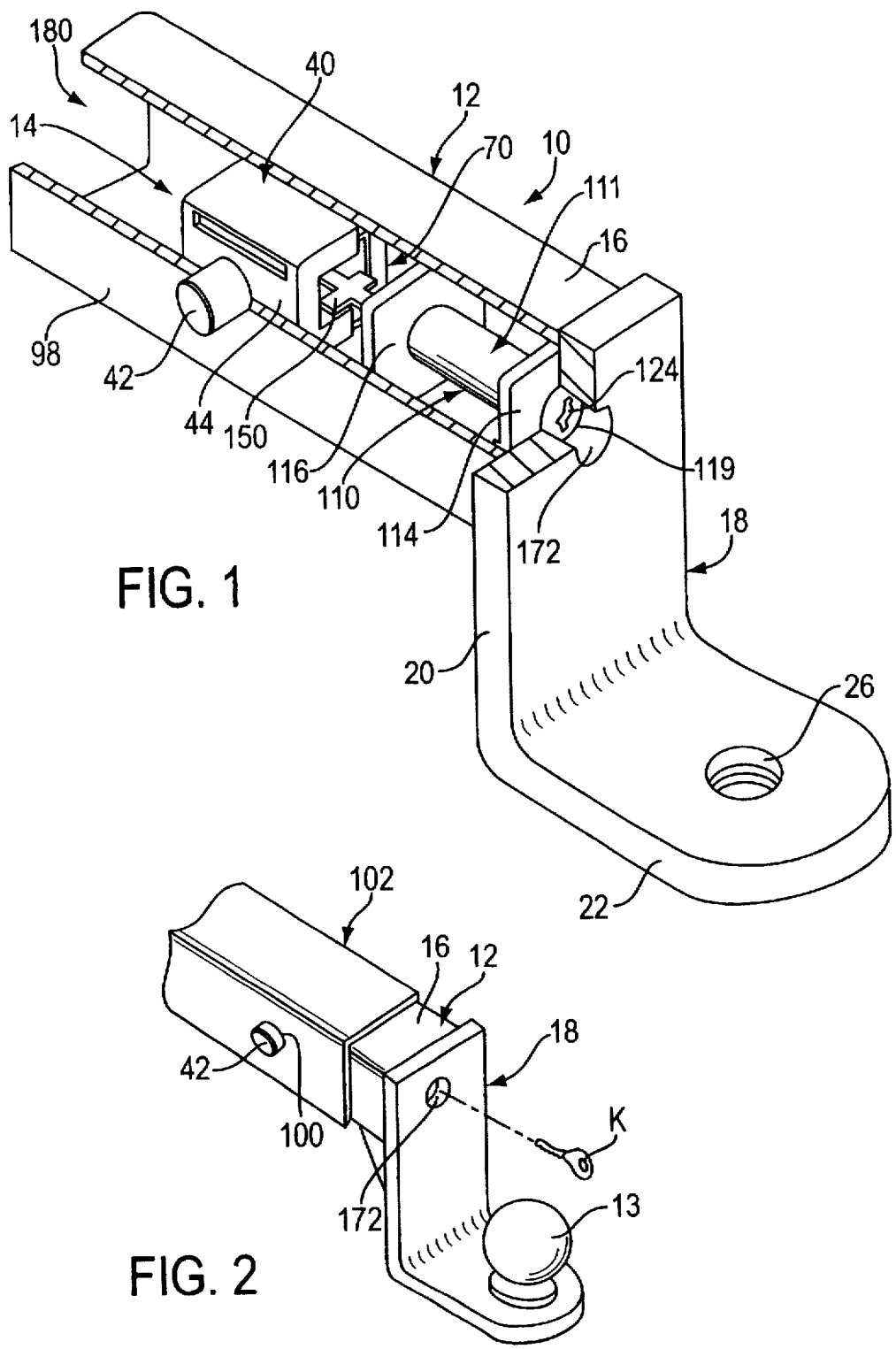

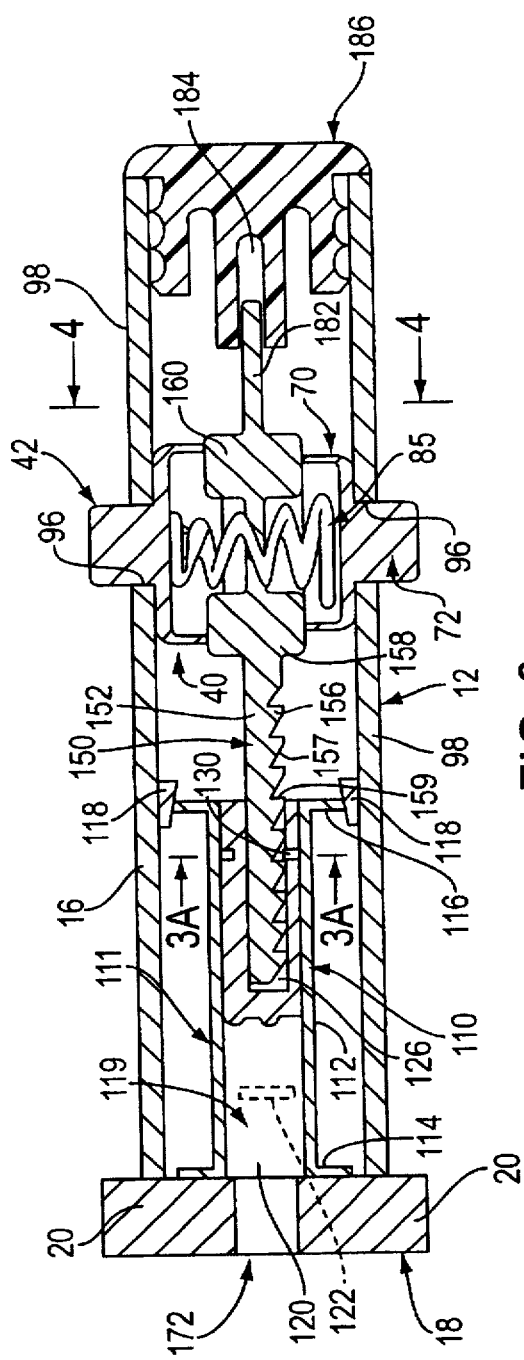
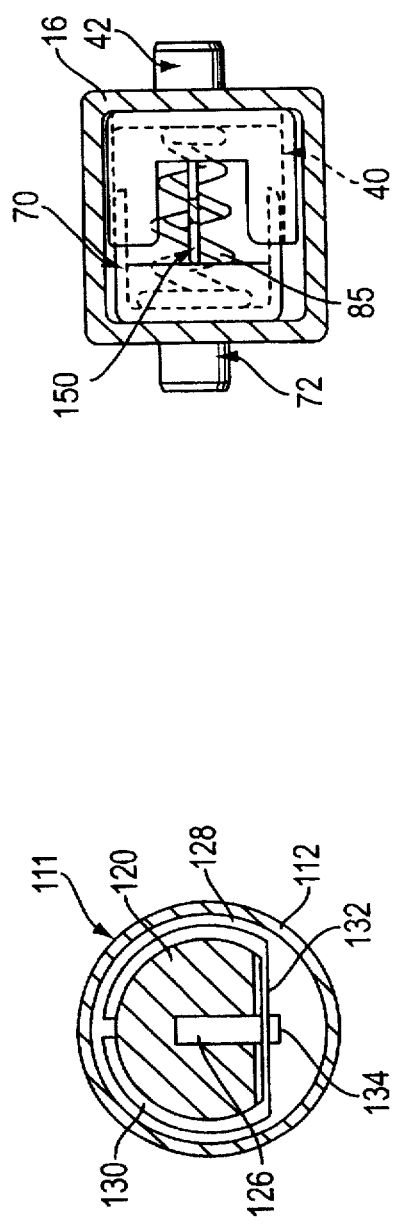

METHODS AND APPARATUS FOR LOCKING A TRAILER HIGH TO A RECEIVER

BACKGROUND OF THE INVENTION

The present invention relates to a trailer hitch and, in particular, to a locking mechanism for a trailer hitch.

A typical trailer hitch comprises a hollow coupling tube of square cross section to which is fixedly attached a spherical ball type connector. The ball is adapted to fit in a spherical socket type connector carried by a trailer, and the coupling tube is adapted to be received in a hollow tubular receiver carried by a towing vehicle. The coupling tube and receiver include through-holes for receiving a fastener such as a bolt to secure the tube to the receiver.

However, it will be appreciated that such a hitch is susceptible to theft since it is only necessary to remove the bolt in order to separate the hitch from the receiver.

In an effort to deal with that problem, locks for trailer hitches have bee proposed, but they are bulky and difficult to install, and are generally designed to be disposed on the outside of the hitch, thereby being unattractive and susceptible to damage.

Therefore, it would be desirable to provide a trailer hitch which can be locked against unauthorized separation from a vehicle, and which is easily installable onto a conventional hitch in a manner to be protected from damage.

SUMMARY OF THE INVENTION

The present invention relates to a trailer hitch containing a locking mechanism, as well as to the locking mechanism per se, and to a method of locking a trailer hitch.

The trailer hitch aspect of the invention comprises a first hollow tube adapted to be telescopingly connected to a second hollow tube of a first vehicle such as a towing vehicle. A spherical connector (such as a ball or ball socket) is affixed to the first hollow tube for connecting the hitch to a second vehicle such as a trailer. A locking mechanism for releasably locking together the first and second tubes includes a pair of locking bolts mounted inside of the first tube. Each locking bolt is movable outwardly from an inward unlocking position to a locking position such that an outer portion of each locking bolt projects through aligned holes in the tubes for locking the first and second tubes together. A key-actuated bolt-control mechanism is disposed inside of the first tube for maintaining the locking bolts in the locking position.

Preferably, the bolt-control mechanism includes a key-operated cylinder rotatable about an axis coinciding with a longitudinal axis of the first tube.

One end of the first tube is preferably covered by a plate, with the plate having a hole formed therein in alignment with the longitudinal axis. A keyhole of the locking cylinder is aligned with the hole.

A spring is preferably provided for biasing the locking bolts outwardly. The bolt-control mechanism includes an arm movable between a first position permitting the locking bolts to be pushed inwardly, and a second position preventing the locking bolts from being pushed inwardly. The arm preferably moves in rotation about a longitudinal axis of the first tube.

The present invention also relates to a method of locking a trailer hitch to a receiver of a vehicle, wherein a locking mechanism is provided in a tube of the hitch. The locking mechanism comprises a pair of locking bolts that are spring biased outwardly through respective holes formed in the tube. The locking bolts are movable inwardly toward one another against the spring bias. Also provided in the tube is a key-actuated member having an arm disposed between the locking bolts. The tube is inserted into the receiver so that the locking bolts spring outwardly into holes formed in the receiver. A key is then inserted into the keyhole of the key-actuated member and rotated to cause the arm to assume a position blocking inward movement of the locking bolts.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 1 is a top front perspective view, partially broken away, of a trailer hitch in combination with a locking mechanism according to the present invention;

FIG. 2 is a top front perspective view of a trailer hitch locked in a receiver by the locking mechanism depicted in FIG. 1;

FIG. 3 is a longitudinal sectional view taken through the locking hitch depicted in FIG. 1;

FIG. 3A is a cross-sectional view taken along the line 3A—3A in FIG. 3, but with the serrated arm removed from the slot;

FIG. 4 is a cross-sectional view taken along the line 4—4 in FIG. 3;

DETAILED DESCRIPTION OF A PREFERRED EMBODIMENT OF THE INVENTION

Figure 5:
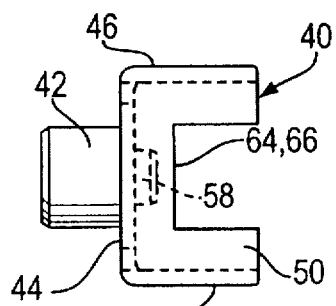
FIG. 5 is a side elevational view of a locking member according to the present invention.
Figure 6:
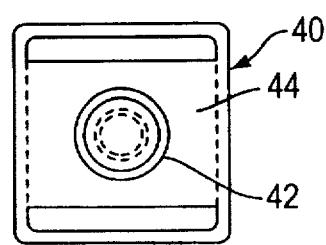
FIG. 6 is a front view of the locking member depicted in FIG. 5.
Figure 7:
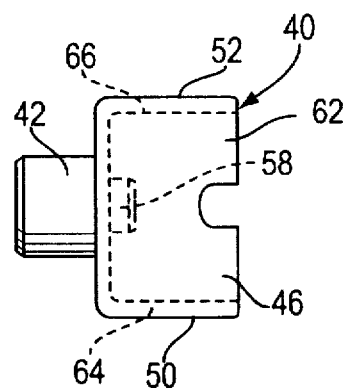
FIG. 7 is a top plan view of the locking member depicted in FIG. 5.
Figure 8:
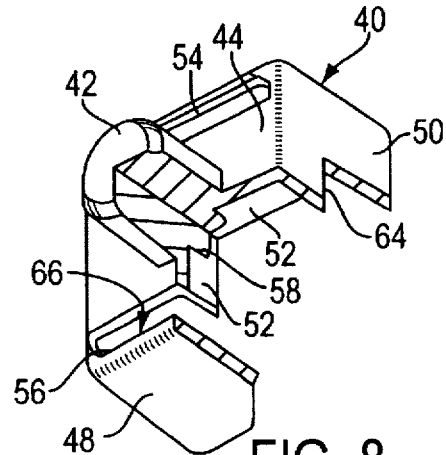
FIG. 8 is a bottom front perspective view, partially broken away, of the locking member depicted in FIG. 5.

With reference to FIGS. 1 and 2, a trailer hitch 10 according to the present invention includes a coupling member 12, a spherical connector in the form of a ball 13, and a locking mechanism 14. The coupling member 12 comprises an open-ended hollow tube 16 of square cross section, and an L-shaped bracket 18 fixed to one end of the tube 16. The bracket 18 includes a vertical leg 20 and a horizontal leg 22.

Mounted on the horizontal leg 22 is the ball 13 which is adapted to be connected in a spherical connector, e.g. a socket of a part carried by a towed vehicle.

The locking mechanism 14 comprises a pair of first and second locking members 40, 70 (see FIGS. 3 and 4) each having a cylindrical locking bolt 42, 72 affixed thereto. The first locking member 40 includes an end wall 44 from which the bolt 42 projects outwardly (see FIGS. 5–8). Projecting from respective peripheral edges of the end wall 44 are a horizontal top wall 46, a horizontal bottom wall 48 and two vertical side walls 50, 52. Formed in the end wall 44 adjacent upper and lower ends thereof are two horizontal slots 54, 56, respectively. Projecting inwardly from an inside surface of the end wall 44 is a short cylindrical protrusion 58 which is coaxial with the locking bolt 42 and serves to mount one end of a spring 85 to be discussed later. Portions of the side walls 50, 52 are notched to form vertical edges 84, 66 facing the other locking member 70.

Figure 9:
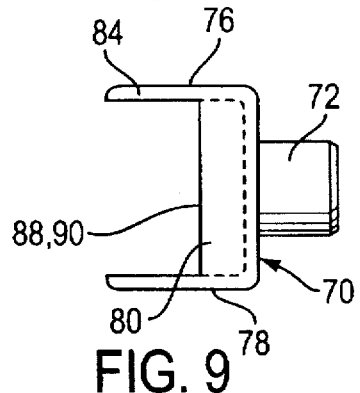
FIG. 9 is a side elevational view of another locking member according to the present invention.
Figure 10:
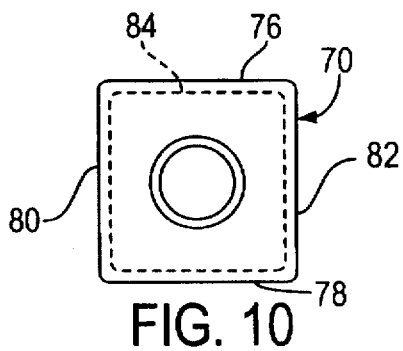
FIG. 10 is a front view of the locking member depicted in FIG. 9.
Figure 11:
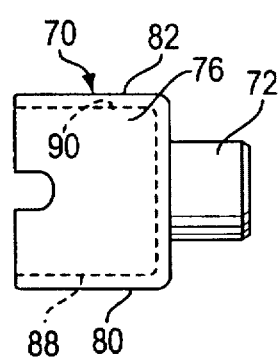
FIG. 11 is a top plan view of the locking member depicted in FIG. 9.
Figure 12:
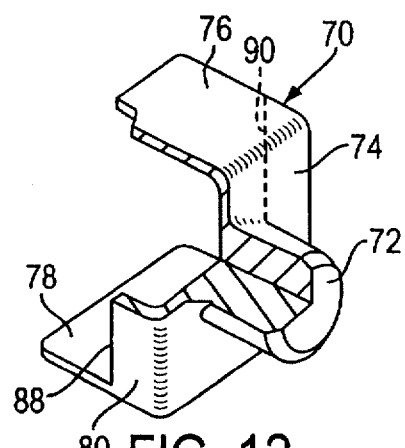
FIG. 12 is a top front perspective view, partially broken away, of the locking member depicted in FIG. 9.

The locking member 70 includes an end wall 74 from which the locking bolt 72 projects outwardly (see FIGS. 9–2). Projecting from respective peripheral edges of the end wall 74 are a horizontal top wall 76, a horizontal bottom wall 78, and two side walls 80, 82. The free ends of the top and bottom walls 76, 78 are dimensioned to be able to enter the slots 54, 56, respectively of the first locking member. Portions of the side walls 80, 82 are notched to form vertical edges 88, 90 facing the other locking member 40.

A coil compression spring 85 is positioned between the locking members 40, 70 to bias those members outwardly away from one another, whereby the locking bolts 42, 72 project through respective holes 96 formed in opposite side walls 98 of the tube 16 (see FIG. 3). The bolts are of sufficient length to also pass through corresponding holes 100 of a hollow, square receiver 102 (see FIG. 2) in which the tube 16 is to be telescopingly inserted, thereby locking the coupling member 12 to the receiver 102. The receiver 102 is fixed to a towing vehicle, not shown.

Situated longitudinally between the locking members 40, 70 and the bracket 18 is a key-actuated locking device 110. That device comprises a housing 111 which includes a hollow cylindrical sleeve 112 having a pair of square flanges 114, 116 affixed to respective ends thereof. The flanges prevent rotation of the housing 111 within the tube 16. A plurality of wedges 118 (FIG. 3) secure the housing 111 within the tube 16.

Disposed in the sleeve 112 is a locking unit 119 of a generally conventional nature. That is, the locking unit 19 comprises a cylinder 120 which includes a resilient projection (not shown) on its outer periphery which snaps into a hole 122 formed in the sleeve 112 (see the broken lines in FIG. 3), thereby securing the lock unit within the sleeve. The cylinder 120 carries conventional tumblers (not shown) which engage a recess (not shown) formed in the sleeve to prevent rotation of the cylinder until a key K is inserted into a keyhole 124 (FIG. 1) formed in the cylinder 120. At that time, rotation of the key produces rotation of the cylinder 120 within a range of rotation defined by the slot 122.

Projecting into the rear of the cylinder is a rectangular recess 126. Extending around the periphery of the cylinder is an annular groove 128 (FIG. 3A) in which a resilient split ring 130 is disposed. It will be appreciated that a lower portion 132 of the ring 130, normally extends across the slot 126 above the floor 134 thereof.

Able to be inserted into the slot 126 of the cylinder 120 is an actuator arm or sprag 150. That arm 150 includes a mounting end 152 having a series of serrations 156.

When the mounting portion 152 is inserted into the slot 126, inclined front camming faces 157 of the serrations 156 engage the lower portion 132 of the ring 130 and cam it elastically downwardly. Once the mounting portion 152 has been inserted to a proper depth into the slot 126 (as will be subsequently explained), the lower portion 132 of the ring 130 will lie behind a vertical rear stop face 159 of one of the serrations, thereby preventing the arm 150 from becoming removed rearwardly from the cylinder 120. When the cylinder 120 rotates, the arm 150 will rotate with it. (Note that the arm 150 is not depicted in FIG. 3A for reasons of clarity.)

The arm 150 includes a pair of longitudinally spaced enlargements 158, 160. One of the enlargements 158 is positioned between the vertical edges 64 and 88 of the locking members 40, 70, respectively, and the other enlargement 160 is positioned between the edges 66, 90 of the locking members 40, 70, respectively. When the actuator arm 150 is vertically oriented, the thicknesses (short dimension) of the enlarged portions extends between the edges 64, 88 and 66, 90 of the members 40, 70, whereby an inward force applied manually to each of the bolts 42, 72 is able to push the bolts 42, 72 inwardly toward one another to an unlocking position against the bias of the spring 85.

However, when the locking cylinder 119 is rotated by the key K to rotate the arm 150 to a horizontal orientation, the widths (large dimension) of the enlargements extend between the edges 64, 88 and 66, 90 (see FIGS. 1, 3 and 4). The enlargements thus are able to act against those edges to prevent the two locking members 40, 70 from being moved inwardly out of their locking state.

The key K is inserted into the keyhole 124 through a hole 172 formed in the vertical leg 172 of the bracket 18, as shown in FIG. 2.

In operation, a conventional hitch is provided with the locking mechanism 14 by inserting the housing 111 into an open end 180 of the tube 16 and securing it by means of the wedges 118. In that position, the keyhole 124 is aligned with the hole 172 formed in the leg 20 of the bracket 18. Then, a unit is formed of the two locking members 40, 70, the spring 85, and the arm 150, the arm 150 extending through the spring 85 such that the enlargements 158, 160 straddle the spring and are located between the edges 64, 88 ad 66, 90 of the locking members. The unit is compressed by pushing the locking members together. The locking members 40, 70 are able to assume a highly compact state, because the free ends of the top and bottom walls 76, 78 of the locking member 70 are able to enter the slots 54, 56 formed in the wall 44 of the other locking member 40. The unit is inserted in that compressed state into the open end 180 of the tube 16 until the bolts 42, 72 snap into their respective holes 96 under the outward bias of the spring 85 and so that the mounting portion 152 of the arm 150 enters the slot 126 of the cylinder 120 and is secured by the ring 130.

It will be appreciated that the distance from the holes 96 to the end of the tube 16 covered by the plate 20 can vary from one trailer hitch to another. Accordingly, it is preferable to make the arm 150 of an excessive length, whereby the user can cut the mounting portion 152 to a suitable length. In that way, the locking mechanism is adaptable to all hitches.

Finally, an end cap 186, which can be formed of any suitable material, such as plastic, is inserted into the tube 16 to close the open end 18 thereof. The cap can be retained in the tube 16 by a friction fit. Formed in the end cap 186 is a slot 184 which receives an end portion 182 of the arms 150. The slot 184 is of circular cross section so that the end portion 182 of the arm 150 can freely rotate therein.

To then install the tube 16 into a receiver 102 (FIG. 2), the bolts 42, 72 are manually pushed inwardly to enable the tube 16 to fit into the receiver. Once the bolts 42, 72 became aligned with the holes 100 of the receiver, they will snap outwardly into those holes to lock the tube 16 to the receiver.

In order to prevent the locking bolts 42, 72 from then being pushed inwardly and out of the holes 100, the key K is inserted into the keyhole 124 and the cylinder 119 is rotated. In so doing, the arm 150 becomes oriented so that the widths of the enlarged portions 158, 160 extend between the edges 64, 88 and 66, 90 of the locking members to act as obstructions preventing the locking bolts 42, 72 from being pushing inwardly sufficiently far to disengage from the holes 100 of the receiver 102.

To release the tube 16 from the receiver 102, the key K is rotated in the opposite direction to cause the thickness of the arm 150 to extend between the edges 64, 88 and 66, 90, thereby enabling the locking bolts 42, 72 to be pushed far enough inwardly (e.g., to be pushed manually by an operator) to disengage from the receiver 102. Accordingly, the hitch 10 can be pulled from the receiver.

It will be appreciated that the locking mechanism 14 according to the present invention is disposed inside of the tube 16 and thus does not detract from the aesthetic appearance of the hitch, and is shielded from damage. Furthermore, the locking mechanism can be easily retrofit into existing hitches, it only being necessary to drill the hole 172 into the leg 20 of the bracket 18.

Although the above description describes the locking members 40, 70 as being spring biased to their locking state, it would be possible instead to spring bias those members 40, 70 inwardly to an unlocking state and to configure the arm 150 and locking members 40, 70 to enable the locking members to be displaced to their unlocking positions in response to rotation of the cylinder 120. As a second alternative, the locking members could be arranged to be moved to both the locking state and unlocking state in response to rotation of the cylinder 120 in respective directions. Although those two alternatives are mechanically feasible, the initially described embodiment is preferred, because it assures that the locking bolts 40, 70 will be in a locked state due to the continuous spring force applied thereto. In contrast, if rotation of the cylinder 120 were required to lock the mechanism, this would constitute a shortcoming and potential hazard due to the possibility of the operator forgetting to lock the hitch. Also, if a spring were constantly biasing the locking members to the unlocking state, it is possible that such unlocking could occur if the internal stop member (such as the arm 150) ceases to oppose the spring force (e.g. through breakage or malfunction).

The present invention ensures that locking will automatically occur, and that no unintended forces will thereafter be applied to the locking members tending to move those members to an unlocked state.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A trailer hitch comprising a first hollow tube adapted to be telescopingly connected to a second hollow tube of a first vehicle; a spherical connector affixed to said first hollow tube for connecting the hitch to a second vehicle; and a locking mechanism for releasably locking together said first and second tubes including a pair of locking bolts mounted inside of said first tube, each locking bolt being movable outwardly from an inward unlocking position to a locking position such that an outer portion of each locking bolt projects through aligned holes in said tubes for locking said first and second tubes together; and a key-actuated, bolt-control mechanism disposed inside of said first tube for maintaining said locking bolts in the locking position.

2. The trailer hitch according to claim 1, wherein said bolt-control mechanism includes a key-operated cylinder rotatable about an axis coinciding with a longitudinal axis of said first tube.

3. The trailer hitch according to claim 2, wherein one end of said first tube is covered by a plate, said plate having a hole formed therein in alignment with said longitudinal axis, a keyhole of said locking cylinder being aligned with said hole.

4. The trailer hitch according to claim 1 further including a spring for biasing said locking bolts outwardly, said bolt-control mechanism including an arm movable between a first position permitting said locking bolts to be pushed inwardly, and a second position preventing said locking bolts from being pushed inwardly.

5. The trailer hitch according to claim 4, wherein said arm is rotatable about a longitudinal axis of said first tube.

6. A trailer hitch, comprising:
   a hollow coupling tube of rectangular cross section adapted to be inserted into a correspondingly shaped receiver carried by a towing vehicle, opposite sides of said tube including holes aligned with one another,
   a bracket fixedly connected to and covering one end of said tube, and
   a ball mounted on said bracket and adapted to be connected to a socket carried by a trailer; and
   a locking mechanism mounted in said tube for releasably locking said hitch to a receiver of a towing vehicle, said locking mechanism comprising:
      a pair of locking bolts mounted inside of said tube in alignment with a respective one of said holes in said tube, said locking bolts being spring-biased outwardly through said respective holes of said tube and being of sufficient length to enter holes of a receiver when said tube is mounted in the receiver to lock said tube to said receiver, said locking bolts being movable inwardly against the spring bias from said respective holes, to release said tube from the receiver, and
      a key-operated locking device mounted inside said tube and being operably connected to said locking bolts for controlling inward and outward movements of said locking bolts, said locking device situated between said locking bolts and said one end of said tube, said locking device including a cylindrical housing containing a tumbler cylinder, said tumbler cylinder including a keyhole accessible through a hole in said bracket.

7. The trailer hitch according to claim 6, wherein said locking device includes an arm extending longitudinally between said locking bolts, said arm being connected to said tumbler cylinder for rotation therewith about a longitudinal axis, in response to key actuation of said locking device, between a first position maintaining said locking bolts in their outward locking positions, and a second position permitting said locking bolts to be displaced inwardly to their unlocking positions by the application of inward forces to said locking bolts.

8. A trailer hitch locking assembly insertable within a first hollow tube of a trailer hitch for locking said first tube to a hollow second tube telescopingly receiving the first tube, said locking assembly comprising:
   a pair of locking members each having an outwardly projecting locking bolt, said locking members being positionable adjacent one another such that said locking bolts are aligned and projecting in opposite directions;

a spring configured to be disposed between said locking members for biasing said locking members away from one another; and a locking device including an arm having a portion thereof configured to extend between said locking members, and a key-actuated lock cylinder aligned with said arm, said arm mounted in one end of said cylinder to be rotatable therewith between a first position for holding said locking members spaced apart by a distance, and a second position permitting said locking members to approach one another, another end of said cylinder disposed opposite said one end having a keyhole for receiving a key to rotate said cylinder.

9. A method of locking a trailer hitch to a receiver of a vehicle, comprising the steps of:

A) providing in a tube of the hitch a locking mechanism comprised of a pair of locking bolts spring-biased outwardly through respective holes formed in said tube and being movable inwardly against the spring bias, and a key-actuated member having an arm disposed between said locking bolts;

B) pushing said locking bolts inward and inserting said tube into said receiver until said locking bolts spring outwardly into holes formed in said receiver; and C) inserting a key into said keyhole of said key-actuated member and rotating said key-actuated member to cause said arm to assume a position blocking inward movement of said locking bolts.

* * * * *